(12) United States Patent
Downey

(10) Patent No.: US 6,560,915 B2
(45) Date of Patent: May 13, 2003

(54) FISHING LURE

(76) Inventor: James E. Downey, 345 E. Clark St., East Palestine, OH (US) 44413

(*) Notice: Subject to any disclaimer, the term of this patent is extended or adjusted under 35 U.S.C. 154(b) by 0 days.

(21) Appl. No.: 09/841,014

(22) Filed: Apr. 24, 2001

(65) Prior Publication Data

US 2002/0152671 A1 Oct. 24, 2002

(51) Int. Cl.⁷ .............................................. A01K 85/00
(52) U.S. Cl. ..................................... 43/42.39; 43/42.36
(58) Field of Search ............................ 43/42.05, 42.08, 43/42.35, 42.36, 42.39

(56) References Cited

U.S. PATENT DOCUMENTS

| | | | | |
|---|---|---|---|---|
| 1,816,725 A | * | 7/1931 | Freeman | 43/42.36 |
| 2,149,054 A | * | 2/1939 | Jones | 43/42.36 |
| 2,517,157 A | * | 8/1950 | Adams | 43/42.36 |
| 2,603,902 A | * | 7/1952 | Stanwyck | 43/42.36 |
| 2,847,791 A | * | 8/1958 | Simmons | 43/42.36 |
| 2,871,609 A | * | 2/1959 | Noches | 43/42.36 |
| 2,938,293 A | * | 5/1960 | Richardson | 43/42.32 |
| 2,940,206 A | * | 6/1960 | Agnew | 43/42.35 |
| 3,376,662 A | | 4/1968 | Harris | |
| 3,497,987 A | * | 3/1970 | Perrin | 43/42.35 |
| 3,877,168 A | * | 4/1975 | Stevens | 43/42.31 |
| 3,986,289 A | | 10/1976 | Zimmerman et al. | |
| 3,995,391 A | | 12/1976 | Bohannon | |
| 4,073,084 A | * | 2/1978 | Favron | 43/42.35 |
| 4,104,820 A | | 8/1978 | Bardebes | |
| 4,616,439 A | | 10/1986 | Lee | |
| 4,774,784 A | | 10/1988 | Lee | |
| 4,930,246 A | | 6/1990 | Cunningham | |
| 4,998,373 A | | 3/1991 | Braswell | |
| 5,214,875 A | | 6/1993 | Hoben et al. | |
| 5,237,772 A | | 8/1993 | Gibbs | |
| 5,992,084 A | * | 11/1999 | Kitagawa | 43/42.31 |

* cited by examiner

Primary Examiner—Kurt Rowan
(74) Attorney, Agent, or Firm—John D. Gugliotta

(57) ABSTRACT

A fishing lure having an outer body surrounding an inner upper buoyant portion located above a lower ballast portion and forming a linear, laterally drawn demarcation interface there between. A fishing line attachment is attached at the lure at the demarcation interface. A first lead formed by an elongated, rigid metal rod is directed toward the lower rear portion of the body and attaches to a first multi prong hook. A second lead is formed by an elongated, rigid metal rod directed toward the lower front portion of the body and attaches to a second multi prong hook. Both hooks are physically related in a manner that a resistance forced placed in the direction opposite the line will result in an urging force directing both hooks slightly inward toward each other.

5 Claims, 2 Drawing Sheets

FISHING LURE

RELATED APPLICATIONS

The present invention was first described in Disclosure Document Number 479,330 filed on Sep. 5, 2000. There are no previously filed, nor currently any co-pending applications, anywhere in the world.

BACKGROUND OF THE INVENTION

1. Field of the Invention

The present invention relates generally to fishing line attachments with a plurality of piercing points and, more particularly, to an improved fishing lure having two three-way hooks placed below a shallow running blade.

2. Description of the Related Art

A great number of people around the world enjoy fishing. Whether fishing for food or for the sport of it, the calmness and serenity of the sport coupled with the excitement of landing "the big one" makes fishing a popular pastime. Fishing for bass or other large fish is an important part of this sport, but the majority of lures available are for smaller fish. While these smaller lures do work, they suffer from some disadvantages. First, there is a decreased chance of the bass or other large fish striking them due to their small size. Second, if the fish does strike the small lure, there is a diminished chance of setting the hook. Finally, the lightweight construction of the hook and interconnecting components increases the risk of losing the fish while trying to reel it in.

A search of the prior art did not disclose any patents that read directly on the claims of the instant invention; however, the following references were considered related.

The following patents disclose a fish hook with two hooks or arms movably secured together.

U.S. Pat. No. 5,237,772 issued in the name of Gibbs
U.S. Pat. No. 5,214,875 issued in the name of Hoben et al.
U.S. Pat. No. 4,998,373 issued in the name of Braswell
U.S. Pat. No. 4,774,784 issued in the name of Lee
U.S. Pat. No. 4,616,439 issued in the name of Lee
U.S. Pat. No. 4,104,820 issued in the name of Bardebes
U.S. Pat. No. 3,995,391 issued in the name of Bohannon The following patents describe an expandable plurality of fish hooks.

U.S. Pat. No. 3,986,289 issued in the name of Zimmerman et al.
U.S. Pat. No. 3,376,662 issued in the name of Harris And, U.S. Pat. No. 4,930,246 issued in the name of Cunningham discloses a double hook fish lure with an adjustable trailer hook.

Consequently, a need has been felt for providing there is a need for a means by which a fishing lure for bass or other large fish can overcome the above-mentioned disadvantages

SUMMARY OF THE INVENTION

It is therefore an object of the present invention to provide an improved fishing line attachments with a plurality of piercing points.

It is a feature of the present invention to provide an improved fishing lure having two three-way hooks placed below a shallow running blade. Briefly described according to one embodiment of the present invention, a fishing lure is provided with enhanced features when compared to conventional fishing lures. The lure resembles a small fish of the type that a bass or other large fish may be attracted to. Special color combinations also aid in attracting specific types of fish. The fishing line attaches to small hook near the mouth of the lure and is connected to two three-way hooks that are suspended from the belly of the lure via strong steel leaders. Additionally, a shallow running blade is provided on the front of the lure to keep it riding higher in the water when casting.

The use of the present invention provides fishermen an increased chance of not only getting larger fish such as bass to bite, but allows them an increased ability to set the hook and land them as well.

An advantage of the present invention is that a heavy rubber bottom helps the lure remain upright in water.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
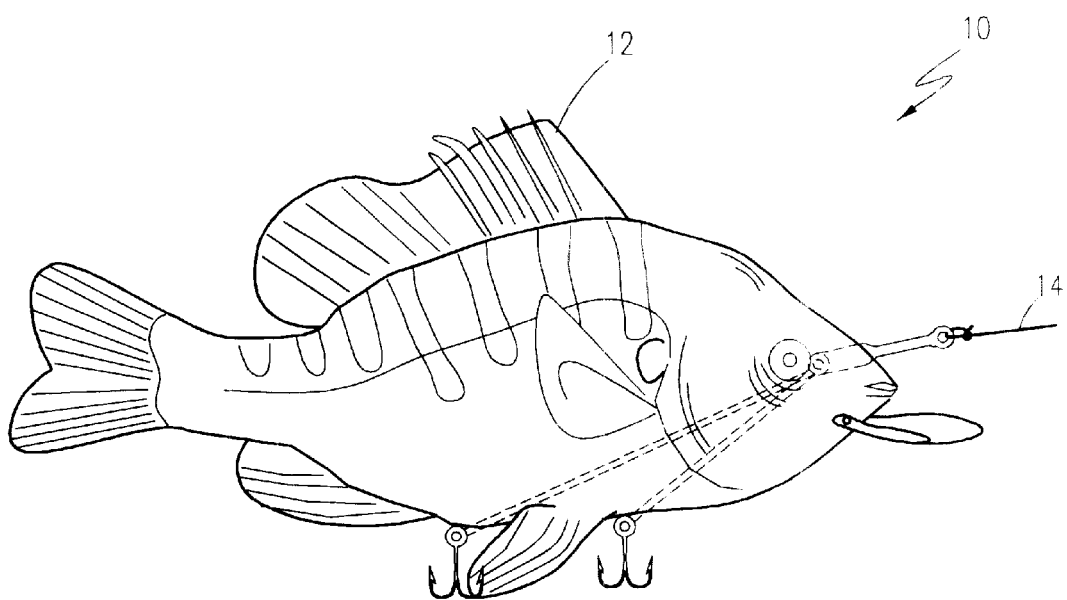
FIG. 1 is a side plan view of an improved fishing lure according to the preferred embodiment of the present invention.
Figure 2:
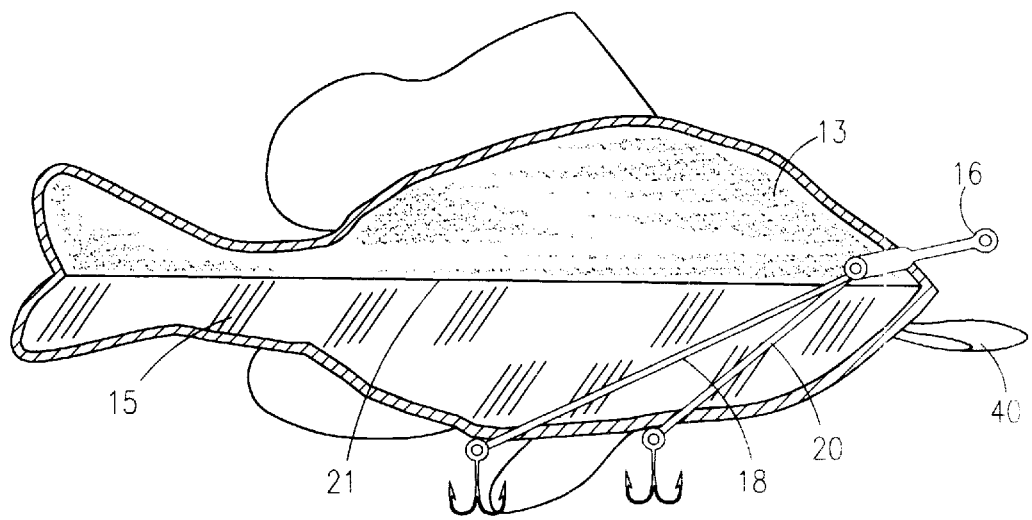
FIG. 2 is a cross sectional plan view taken along the linear lateral centerline thereof.
Figure 3:
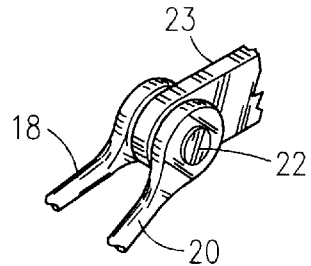
FIG. 3 is a partial perspective view of an eye line attachment for use therewith.
Figure 4:
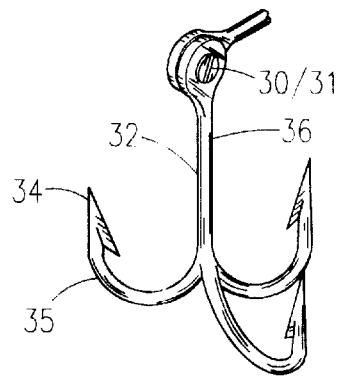
FIG. 4 is a partial perspective view of a pivoting hook for use therewith.

Referring now to FIGS. 1–4, an improved fishing lure apparatus 10 is shown, according to the present invention, is provided with enhanced features when compared to conventional fishing lures. The lure 10 has an outer body 12 resembles a small fish of the type that a bass or other large fish may be attracted to. It is envisioned that the outer surface of the body 12 can be aesthetically enhanced with color combinations also aid in attracting specific types of fish. The outer body 12 surrounds an inner upper buoyant portion 13 located above a lower ballast portion 15. The ballast portion 15 is envisioned as being heavier that the buoyant portion 13 such that when placed in water the ballast portion 15 will naturally find a level beneath the buoyant portion 13. A fishing line 14 attaches to a line attachment means 16, such as an eye line attachment shown in FIG. 2, that is in pivoting physical contact with both a first lead 18 and a second lead 20 by a first pivoting connection 22 at the line of demarcation 21 and a first end 23 of the line attachment means 16. The first lead 18 is a linearly elongated, rigid metal rod directed toward the lower rear portion of the body 12. The second lead 20 is a linearly elongated, rigid metal rod directed toward the lower front portion of the body 12. In each case, both leads 18, 20 terminate at a second pivoting connection 30 or third pivoting connection 31, respectively, at a second end 36 of the hook 32 that pivotally supports a hook 32 having a plurality of grasping prongs 34 at a first end 35 of the hook 32.

In this configuration, both hooks 32 are physically related in a manner that a resistance forced placed in the direction opposite the line 14 will result in an urging force directing both hooks 32 slightly inward toward each other.

Additionally, a shallow running blade 40 is provided on the front of the lure to keep it riding higher in the water when casting. The running lade 40 is envisioned as being located near the line of demarcation 21 between the upper buoyant portion 13 and lower ballast portion 15.

2. Operation of the Preferred Embodiment

In operation, the present invention is used as any conventional lure, but provides fishermen an increased chance of not only getting larger fish such as bass to bite, but allows them an increased ability to set the hook and land them as well.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. Therefore, the scope of the invention is to be limited only by the following claims.

What is claimed is:

1. A fishing lure apparatus comprising:

an outer body surrounding an inner upper buoyant portion located above a lower ballast portion and forming a linear, laterally drawn demarcation interface there between, said demarcation interface completely transecting said lure, said ballast portion being heavier than said buoyant portion;

fishing line attachment means in direct physical contact with said outer body;

at least one hook in physical contact with said body at said lower ballast portion; and a first lead, said first lead pivotally attached to said fishing line attachment means at an end, said lead pivotally attached to a hook at an opposite end and having a linearly elongated, rigid metal rod connecting said fishing line attachment means to said at least one hook, said first lead coupled with said fishing line attachment means by a first pivoting connection, said first lead coupled with said at least one hook by a second pivoting connection; and a second lead, said second lead having a linearly elongated, rigid metal rod connecting said fishing line attachment means to said at least one hook, said second lead coupled with said fishing line attachment means by a first pivoting connection, said second lead coupled with said at least one hook by a third pivoting connection.

2. The fishing lure apparatus of claim 1, wherein said lead is pivotally coupled at a first end to said fishing line attachment means.

3. The fishing lure apparatus of claim 2, wherein said lead is pivotally coupled at a second end to said hook.

4. The fishing lure apparatus of claim 1, wherein each said hook has a plurality of grasping prongs.

5. The fishing lure apparatus of claim 1, further comprising a shallow running blade provided on a front of said lure positioned below said demarcation interface, said running blade provided to allow said lure to ride higher in water after casting of a fishing line.

* * * * *